(No Model.)
F. A. HODGMAN.
TIRE.
No. 585,205.  Patented June 29, 1897.
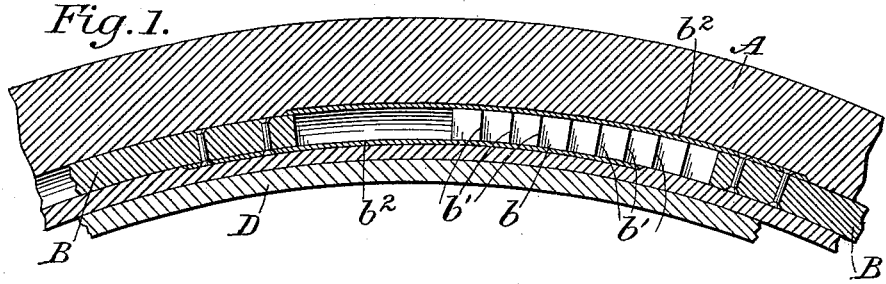
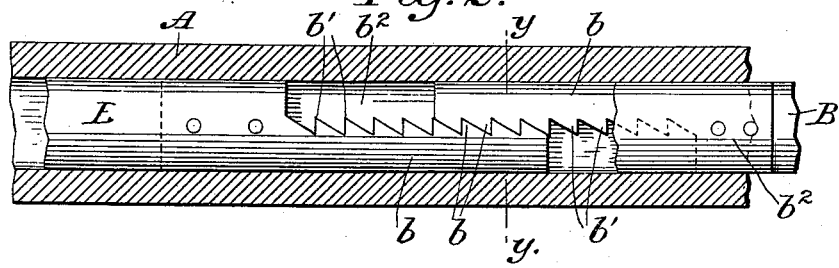
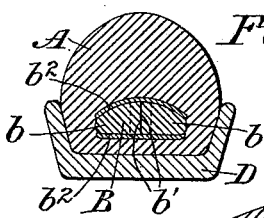
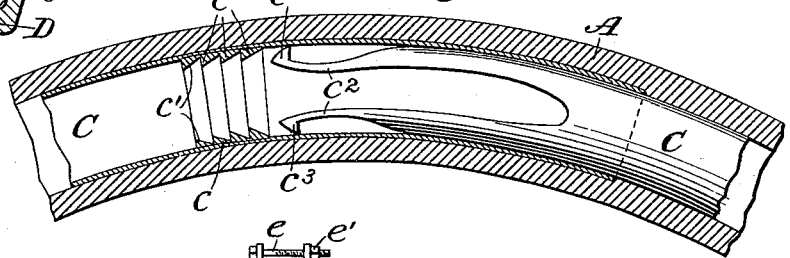
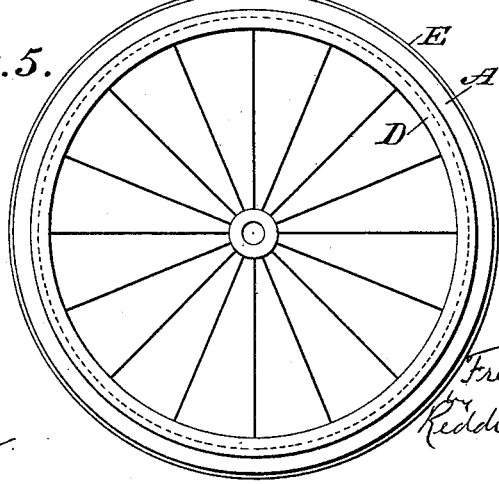
Attest:
A. N. Jesbera
F. M. Eggleston
Inventor:
Frederick A. Hodgman
by Redding, Kiddle & Greeley
Attys.

UNITED STATES PATENT OFFICE.

FREDERICK A. HODGMAN, OF YONKERS, NEW YORK.

TIRE.

SPECIFICATION forming part of Letters Patent No. 585,205, dated June 29, 1897.

Application filed June 16, 1896. Serial No. 595,742. (No model.)

*To all whom it may concern:*

Be it known that I, FREDERICK A. HODGMAN, a citizen of the United States, residing in Yonkers, in the county of Westchester and State of New York, have invented certain new and useful Improvements in Tires, of which the following is a specification, reference being had to the accompanying drawings, forming a part hereof.

This invention relates to rubber tires of the class generally known as "solid" tires in distinction from the class generally known as "pneumatic" tires, although tires to which my invention is applied are not necessarily made of a solid piece of rubber, as will appear more clearly hereinafter. Such tires are now usually made with a core of wire or of a strip of metal, which is relied upon to retain the tire in place upon the rim of the wheel and to maintain the rubber in a state of compression. Tires having such a core are ordinarily molded straight. The ends of the wire or metal core are then brought together, when the tire has been applied to the rim of the wheel, and are united by welding or otherwise, the rubber being pushed back to expose the ends of the core. Finally, the ends of the rubber are brought together and cemented or held by the tension of the wire. It is practically impossible for an ordinary wheelwright to apply a tire of this description, and the consequence is that the wheels to which rubber tires are to be applied must be sent to some place where may be found special facilities for doing the work. I have sought to provide an improved tire of this general description which can be molded or made in an annular form, thereby avoiding the joint between the ends of the rubber, and can be sent out from the factory in that form and applied to the wheels by any ordinary wheelwright or other person without any difficulty whatsoever, while at the same time the tires shall be secured firmly to the wheel without the possibility of accidental displacement.

In accordance with my invention I form the ends of the wire or other metallic core (which are wholly inclosed within and covered by the body of the tire) with inclined interlocking teeth, so that when the tire has been applied to the wheel and is compressed such ends shall automatically engage with each other at the time of greatest compression of the tire and shall, therefore, prevent subsequent expansion thereof. It will be obvious, as this description proceeds, that the ends of the core might have various forms of teeth to accomplish this result, although I shall describe certain specific embodiments of the invention, which are intended for illustration merely.

In the accompanying drawings, Figure 1 is a longitudinal central section of a portion of a tire which embodies my invention, the plane of the section being transverse to the section of the wheel, and a portion of the rim of the wheel being also shown. Fig. 2 is a longitudinal central section of the tire in a plane parallel with the axis of the wheel, the core being shown in plan view with parts broken away to show more clearly certain features. Fig. 3 is a transverse section on the plane indicated by the line $y\ y$ of Fig. 2. Fig. 4 is a sectional view similar to Fig. 1, but showing a core of different form. Fig. 5 is a side elevation of a wheel having a rubber tire applied thereto and showing means for compressing the tire upon the wheel.

As represented in Figs. 1, 2, and 3 of the drawings, the main body of the tire is composed of a substantial thickness of rubber A, with a core B, which is preferably a flattened wire or strip of metal wholly inclosed within and covered by the body of the tire. Inasmuch as I prefer to make the tire in an annular form and at the same time to provide for a subsequent contraction in length of the core, so that the tire can be secured firmly upon the rim of a wheel, the core does not have its ends united before the rubber dough is formed about it, but its ends are formed, preferably, to overlap slightly when the tire is in the mold or vulcanizer and to be capable of slipping past each other to a greater extent when the tire is compressed upon the wheel, and also of engaging with each other automatically when the tire has been compressed to the full extent, so that the tire shall be held upon the rim of the wheel and the rubber maintained in a state of compression. As represented in the figures referred to, the ends of the core are reduced in width, as at $b$, so that the reduced portions may overlap each other in the tire, and such reduced portions are provided upon their abutting faces with inclined interlocking teeth $b'$, so that the two reduced portions may be slipped past each other as the tire is compressed, but shall prevent any backward movement or expansion of the tire when the tire is released from the compressing devices. The core may be suitably prepared before the rubber dough is applied to permit of its movement within the rubber, as by coating it with paper or cloth or other suitable substance, in a manner commonly practiced in the art. Provision is also made to prevent the introduction of the rubber between the ends of the core in such a manner as to prevent their proper movement, a thin strip of metal $b^2$ being secured to each of the upper and under sides of the core to cover and protect the joint between the ends thereof without interfering with the free movement of such ends toward each other in the manner described.

In the construction represented in Fig. 4 the core of the tire is in the form of a hollow tube C, one end of which is reduced in diameter sufficiently to permit it to be introduced within the other end. In the larger end of the tubular core is secured a sleeve $c$, which is provided with a series of internal teeth $c'$. The reduced end of the tubular core is slotted longitudinally for a short distance to form yielding arms or fingers $c^2$, each of which has a tooth $c^3$ to engage the teeth $c'$ of the sleeve $c$. It will be obvious that when the tire is compressed the teeth $c^3$ will slip over the teeth $c'$ to permit the compression of the tire and will then engage automatically with said teeth $c'$ to prevent the expansion of the tire.

As already stated, the tire is preferably molded in an annular form, and when it comes from the mold it is large enough to slip easily upon the grooved rim D of the wheel, although it may be formed in a straight piece with a hole through which the core is drawn and its ends subsequently brought together. Then a band E is applied to the wheel outside of the tire and its ends are drawn together by any suitable means, as by a bolt $e$ and nut $e'$, thereby compressing the tire upon the rim of the wheel. When the tire has been compressed as much as possible or as desirable, the band E is removed, but the tire does not expand for the reason that the overlapping ends have automatically interlocked the one with the other to prevent the expansion of the core. Therefore the tire will be firmly secured upon the rim of the wheel and the rubber will be maintained in a state of compression.

It will be obvious that the form of the teeth for effecting the automatic engagement of the two free ends of the core may be varied without departing from the spirit of my invention and that the form of the core may also be varied. Therefore I do not desire to be limited to the precise construction of the core and of such devices which I have shown herein.

I claim as my invention—

1. A solid-rubber tire having a core wholly inclosed within and covered by the body of the tire, the ends of said core being overlapped and formed on their abutting faces with inclined, interlocking teeth to slip past each other as the tire is compressed and to engage automatically, the one with the other, to prevent expansion of the tire.

2. A solid-rubber tire having a core wholly inclosed within and covered by the body of the tire, the ends of said core being reduced in width and overlapped and formed on their abutting faces with inclined, interlocking teeth which permit the ends to slide past each other as the tire is compressed and to engage with each other to prevent expansion of the tire.

This specification signed and witnessed this 15th day of June, A. D. 1896.

FREDERICK A. HODGMAN.

In presence of—
A. N. JESBERA,
W. B. GREELEY.